United States Patent Office 3,182,909
Patented May 11, 1965

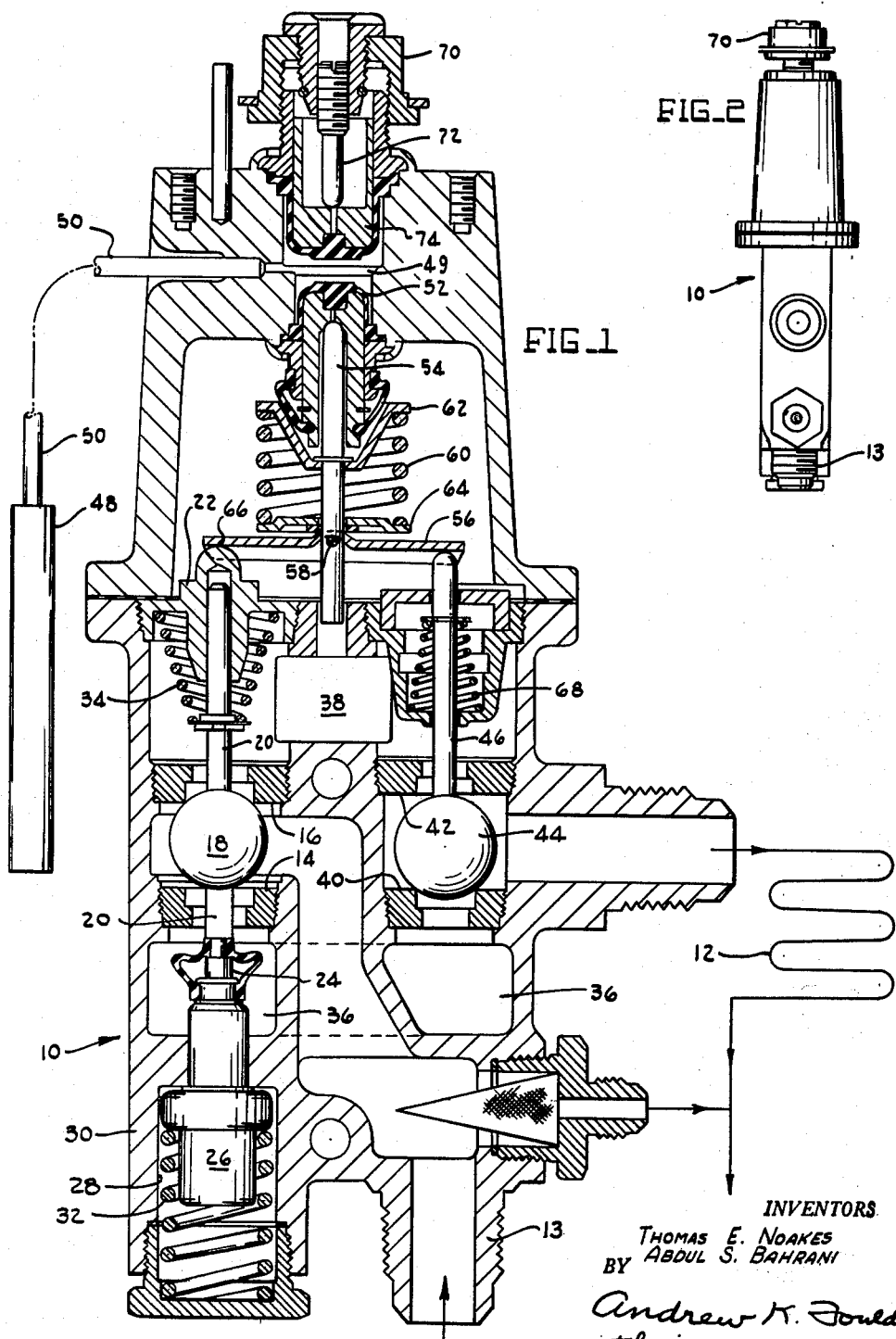

3,182,909
AIR CONDITIONER VALVE
Thomas E. Noakes, Detroit, and Abdul S. Bahrani, Drayton Plains, Mich., assignors to American Radiator & Standard Sanitary Corporation, New York, N.Y., a corporation of Delaware
Filed Aug. 1, 1962, Ser. No. 213,985
3 Claims. (Cl. 236—1)

This invention relates to improvements in valves for supplying heating fluids to an air conditioner during the heating season and cooling fluid to the air conditioner during the cooling season. Valves of this type are equipped with room temperature responsive power means for modulating the flow of fluid through the valve in accordance with the need for air conditioning. Valves of this type are also equipped with season change-over mechanisms for enabling the valve to function correctly both during the heating season and the cooling season.

The present invention has for its primary object the provision of an air conditioner valve having an improved drive connection between the room temperature responsive power means and the fluid modulating element such that each incremental motion of the room temperature responsive power means results in a magnified movement of the fluid modulating element.

A further object of the invention is to provide an air conditioner valve wherein the above-mentioned drive connection can if desired be operatively disposed in a relatively flat valve housing.

Other objects of this invention will appear from the following description and appended claims, reference being had to the accompanying drawings forming a part of this specification wherein like reference characters designate corresponding parts in the several views.

In the drawings:

FIGURE 1 is a sectional view taken through one embodiment of the invention and showing same connected with conventional components of a system in which it is used; and FIG. 2 is a reduced size right end view of the FIG. 1 embodiment.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, there is shown an air conditioner valve 10 comprising a valve housing for supplying heating liquid such as hot water to the room air conditioner heat exchanger 12 during the heating season, and for supplying cooling liquid to said heat exchanger in the cooling season. The flow through valve 10 is modulated by a room temperature responsive thermal bulb 48 preferably located at the return air inlet to exchanger 12.

Valve 10 is provided with a liquid inlet 13 which supplies liquid to the opposed valve seats 14 and 16. Arranged between these valve seats is a spherical valve means 18 having a push rod 20, one end of which is slidably supported in the insert member 22, and the other end of which is operatively engaged with the piston 24 of thermostatic power element 26. Power element 26 may be of conventional construction, as for example the construction shown in FIG. 1 of U.S. Patent 2,636,776.

In the illustrated embodiment power element 26 is mounted within a dead-ended cavity 28 formed in the valve housing 10 so that during the periods when hot liquid is supplied to the valve the heat from the liquid will travel by conduction through the housing walls to thus heat power element 26 and cause its piston 24 to move spherical element 18 to its illustrated position engaged with valve seat 16. Power element 26 is mounted in cavity 28 by means of a compression spring 32 so that excessive heating of the power element merely results in longitudinal movement of the power element casing away from valve seat 16. When cooling fluid is supplied to housing 10 the temperature responsive material in power element 26 contracts so that compression spring 34 is enabled to move valve element 18 downwardly to a position engaging seat 14. It will be seen therefore that when heating liquid is supplied to the valve, said liquid will be directed through seat 14 into chamber 36, and when cooling liquid is supplied to the valve, said liquid will be directed through seat 16 to the chamber 38. Chamber 36 supplies hot liquid to hot valve seat 40, and chamber 38 supplies cold liquid to cold valve seat 42. The assembly of members 18 and 26 constitutes a season changeover means for allowing the valve housing 10 to correctly feed the heat exchange liquids past the selected valve seat 40 or 42, both during the heating and cooling seasons.

Interposed between hot seat 40 and cold seat 42 is a spherical valve element 44 which is connected with a push rod 46. The general arrangement is such that during the heating season the push rod is moved vertically for causing valve element 44 to modulate the flow of heating fluid through seat 40, and during the cooling season push rod 46 is moved to modulate the flow of cooling fluid through valve seat 42. To provide the motive force for push rod 46 there is utilized a room temperature responsive power means comprised of conventional thermal bulb 48, a suitable length of capillary tubing 50, and a diaphragm 52 which is movable vertically in response to the expansion and contraction of the fluid in bulb 48.

The room temperature responsive power means is operatively connected with push rod 46 by means of a drive connection which includes a stem 54 and a lever 56. As illustratively shown in FIG. 1, lever 56 has its left end immovably and at all times resting on the upper end of insert 22 so as to constitute a fulcrum 66 for the lever. The intermediate portion of the lever engages an abutment-forming pin 58 which extends through stem 54; the right end of lever 56 rests on push rod 46. Disposed above lever 56 is a compression spring 60 having its upper end engaged with a spring retainer 62 carried by stem 54 and having its lower end engaged with a spring retainer 64 suitably abutting on the intermediate portion of the lever. Spring 60 biases stem 54 up and the lever 56 down.

It will be seen that downward movement of stem 54 by fluid pressure on diaphragm 52 allows spring 60 to force lever 56 downwardly about its fixed fulcrum point 66. In order to force the lever 56 upwardly there is provided a compression spring 68 suitably arranged to act on push rod 46. Thus, when bulb 48 cools to provide a lessened pressure in space 49 spring 68 is enabled to force lever 56 upwardly about fulcrum point 66.

In order to vary the room temperature at which rod 46 can move there may be provided a conventional manually operable dial member 70 which carries a pin 72. The lower end of pin 72 engages a piston 74 so that rotation of dial 70 in one direction causes the piston to move downward and rotation of the dial in the opposite direction allows the piston to move upward. Downward movement of piston 74 increases the pressure in space 49, and thus decreases the ambient temperature necessary to move push rod 46 and valve element 44 downwardly a given distance. Thus, such downward movement of piston 74 by dial 70 lowers the temperature setting for the air conditioner, and upward movement of piston 74 raises the temperature setting for the conditioner.

In operation of the illustrated device, the valve is shown in a position for receiving heating liquid, and the room temperature responsive bulb 48 is shown completely satisfied, i.e., valve element 44 is closed against flow of heating liquid through hot seat 40. The call for heat by bulb 48 involves a lessening of the fluid pressure in space 49, which allows spring 68 to move valve element 44 away from seat 40, thus permitting the hot liquid to flow to the room conditioner heat exchanger 12. If the valve element 44 should move upward to engage seat 42 while the fluid pressure in space 49 is still relatively low there will be no additional upward travel of the push rod 46, lever 56, or stem 54.

As bulb 48 begins to be satisfied the resultant increased pressure developed in space 49 will move stem 54 downwardly so that pin 58 will tend to leave lever 56 and thereby permit spring 60 to move the lever downwardly for bringing valve element 44 toward valve seat 40, thus interrupting the flow of heat exchange liquid to heat exchanger 12. Any downward overtravel of stem 54 will cause pin 58 to move away from lever 56 and will cause spring 60 to compress, but without overtravel damage.

During the cooling season, when cold liquid is supplied to inlet 13 the changeover power element 26 will have its sensing material contract so that spring 34 will move element 18 away from seat 16 and into engagement with seat 14. The cold liquid will thereby be supplied through seat 16 to chamber 38 and cold seat 42. On bulb 48 calling for cooling (by expansion of the bulb fluid) stem 54 moves down, and spring 60 forces lever 56 to move down about fulcrum 66 for thereby powering valve element 44 away from cold seat 42. As bulb 48 begins to be satisfied the bulb fluid contracts so that spring 68 moves lever 56 upwardly such that element 44 closes against seat 42.

The primary feature of the present invention resides in the drive connection provided by stem 54, spring 60 and lever 56 such that each incremental movement in the room temperature responsive power means results in a magnified movement of valve element 44. This drive connection is related to the other components so that each of lever 56 and stem 54 is in the same plane as the two push rods 20 and 46. By thus constructing the component mechanisms it is possible to provide a relatively flat valve housing such as is shown in FIG. 2. This flat valve housing has advantages in certain types of installations as regards space accommodations. Within the broader aspects of the invention the drive connection and associated components could be utilized in other valve housing configurations. The novel concepts are set forth in the accompanying claims.

We claim:

1. In an air conditioning valve adapted to handle either heating or cooling fluids and having a hot fluid seat, a cold fluid seat aligned with said hot seat, a valve element floatably positioned for selective cooperation with alternate ones of said seats, a room temperature responsive power means for operating said valve element, and a season changeover means operated by the temperature condition of the fluid flowing through the valve for alternately supplying cold fluid to the cold seat or hot fluid to the hot seat: the improvement comprising a drive connection between the room temperature responsive power means and the valve element; said drive connection comprising a lever having a single fulcrum located at a first point thereon and having an operating connection with the valve element at a second point thereon, and a stem operated by the room temperature responsive power means and operatively engaging the lever at a third point thereon so that each incremental movement of the room temperature responsive power means results in a magnified movement of the valve element; the operative engagement between the stem and lever being effected through an abutment and compression spring; said abutment being carried on the stem and tending to move away from the lever when said stem is moving in the direction of the hot seat, and the compression spring operatively biasing the lever to maintain same in engagement with the abutment until the stem has moved a sufficient distance to cause closure of the valve element against the hot seat, after which the lever can have an overtravel movement without affecting the valve element.

2. In an air conditioner valve housing adapted to handle either heating or cooling fluids and having opposed hot and cold valve seats, a valve element floatable disposed between said seats for selective cooperation therewith, a room temperature responsive power means for operating said valve element, and season changeover means operated by the temperature condition of the fluid flowing through the valve housing for alternately supplying cold fluid to the cold seat or hot fluid to the hot seat; the improvement comprising the formation of the changeover means and the valve element as spherical valve members, each equipped with a push rod which has supported guided engagement with the valve housing; said push rods being disposed parallel to one another and defining the general plane of the valve housing; the improvement further comprising a drive connection located in the valve housing between the room temperature responsive power means and the valve element push rod; said drive connection comprising a lever extending generally normal to the two push rods and in the plane thereof, and a stem operated by the room temperature responsive power means and operatively engaging an intermediate portion of the lever; said lever having one of its ends constituting a fixed fulcrum located generally in axial alignment with the push rod for the season changeover means and having its other end operatively engaging the valve element push rod so that each incremental movement of the room temperature responsive power means produces a magnified movement of the valve element.

3. In an air conditioner valve housing having first and second opposed valve seats, a first valve means including a valve element floatably disposed between said valve seats, a season changeover power element responsive to the temperature condition of the fluid flowing through the valve housing for causing the first valve element to alternately engage the first and second valve seats, third and fourth valve seats arranged in the valve housing for receiving fluid from respective ones of the first and second valve seats, second valve means including a second valve element floatably disposed between the third and fourth valve seats, and a room temperature responsive power means including a thermal fluid bulb and reciprocable stem for operating said second valve element between the third and fourth valve seats; the improvement comprising the formation of each of said valve means as a spherical valve element-push rod assembly arranged so that the push rods are parallel to each other and to the aforementioned stem; said push rods and stem being in the same general plane which defines the general plane of the valve housing; the improvement further comprising a lever extending generally normal to the two push rods and in the plane thereof, one end of said lever constituting a fixed fulcrum located generally in axial alignment with the push rod for the first valve element, the other end of said lever operatively engaging the push rod for the second valve element, the aforementioned stem having an abutment located adjacent an intermediate portion of the lever; the improvement further comprising a first compression spring arranged to bias the lever toward a position engaged with the stem abutment, and a second compression spring acting on the second valve means to bias the push rod thereof into engagement with the lever; whereby thermal expansion of the bulb fluid causes the stem abutment to move in a direction in which it tends to leave the lever so that the first compression spring is enabled to act on the lever for moving the second valve element toward the third valve seat, and thermal contraction of the bulb fluid reduces the bulb fluid pressure on the stem so that the second compression spring is enabled to move the second valve element away from the third valve seat.

References Cited by the Examiner

UNITED STATES PATENTS

| 2,355,043 | 8/44 | Adlam | 236—12 X |
| 2,447,560 | 8/48 | Branson | 236—1 |
| 2,636,685 | 4/53 | Clark | 236—99 |
| 2,805,025 | 9/57 | Dillman | 236—1 |
| 2,844,319 | 7/58 | McGrath | 236—1 |

EDWARD J. MICHAEL, *Primary Examiner.*